United States Patent [19]

Kosaka

[11] 3,718,774

[45] Feb. 27, 1973

[54] INSTRUCTIONAL TAPE RECORDER FOR PREVENTING ERRONEOUS ERASURE ON A DOUBLE TRACK MAGNETIC TAPE USING TWO SENSING MEANS

[75] Inventor: Masahiro Kosaka, Hirakota-shi Osaka, Japan

[73] Assignee: Matsushita Electric Industrial Co., Ltd., Osaka, Japan

[22] Filed: Aug. 13, 1970

[21] Appl. No.: 63,485

[30] Foreign Application Priority Data

Aug. 21, 1969 Japan ............................44/66983
Aug. 21, 1969 Japan ............................44/66984

[52] U.S. Cl.........179/100.2 D, 35/35 C, 179/100.2 Z
[51] Int. Cl............................G11b 15/04, G09b 5/04
[58] Field of Search...179/100.2 D, 100.2 Z; 35/35 C

[56] References Cited

UNITED STATES PATENTS 3,175,222 3/1965 Nerwin ..........................179/100.2 Z
3,582,569 6/1971 Staar.............................179/100.2 Z
3,586,336 6/1971 Rosenblatt.....................179/100.2 Z

*Primary Examiner*—Bernard Konick
*Assistant Examiner*—Robert S. Tupper
*Attorney*—Wenderoth, Lind & Ponack

[57] ABSTRACT

An instructional tape recorder comprises a recording and a reproducing means for recording and reproducing an instructional tape which has an instructional program recorded intermittently thereon and an oral response of a student made to said instructional program. Said instructional tape recorder can be used as a conventional tape recorder and as an instructional tape recorder by operating a selecting switch.

Said magnetic tape having said instructional program is protected from an erroneous erasure by detecting a break out lug made in the back edge of a tape case containing said magnetic tape.

Said magnetic tape is divided into two recording tracks, and each of which is used for recording and reproducing said instructional program and an oral response of a student.

3 Claims, 13 Drawing Figures

INVENTOR
MASAHIRO KOSAKA

BY *Wenderoth, Lind & Ponack*
ATTORNEYS

INVENTOR
MASAHIRO KOSAKA

BY Wenderoth, Lind & Ponack
ATTORNEYS

INVENTOR
MASAHIRO KOSAKA

BY Wenderoth, Lind & Ponack
ATTORNEYS

INVENTOR
MASAHIRO KOSAKA

BY Wenderoth, Lind & Ponack
ATTORNEYS

INVENTOR
MASAHIRO KOSAKA

BY Wenderoth, Lind & Ponack
ATTORNEYS

INSTRUCTIONAL TAPE RECORDER FOR PREVENTING ERRONEOUS ERASURE ON A DOUBLE TRACK MAGNETIC TAPE USING TWO SENSING MEANS

This invention relates generally to a tape recorder, and more particularly to a tape recorder for language study on which an instructional program and an oral response made to the instructional program may be recorded.

In learning a foreign language, it is considered to be quite useful for a student to hear an instructional program repeatedly and to make oral responses to said instructional program. And it is also quite effective for a student to repeatedly hear his recorded oral response in comparison with said instructional program.

This repetitive hearing and speaking makes it possible for a student to understand and grasp an instructional program and to form proper linguistic habits of a foreign language.

The tape recorder for language study referred to herein is one which has at least two recording and reproducing channels in order to record and reproduce said instructional program and responses.

On the other hand, a conventional tape recorder, not for language study, has one recording and reproducing channel with which to record and reproduce said instructional program. Therefore a student can not record his oral responses with such conventional tape recorder while listening to the instructional program.

Generally an instructional program is recorded on a magnetic tape with intervals between two succeeding parts of the instructional program which, in parctice, are composed of words or phrases.

When a student studying foreign language with said tape recorder wishes to hear his oral response made during the time interval, he has to record his oral response with said tape recorder and reproduce his recorded oral response after the tape of said tape recorder is rewound, in order to compare his oral response with said instructional program.

The tape recorder for language study, therefore, has a recording facility of learner's oral response. That ability, however, gives rise to the danger of erroneous erasure of recorded materials.

Another problem involving said tape recorder is the interchangeability of tapes between said tape recorder for language study and a conventional tape recorder.

Moreover, said tape recorder for language study has to be used, if possible, as a conventional tape recorder for the recording and reproducing of music or other speech.

The tape recorder for language study thus involves many problems to be solved in order to have a good interchangeability as well as operation safe from the erroneous erasure of valuable recorded materials.

It is an object of the present invention to provide a tape recorder for language study use capable of eliminating these difficulties and inconveniences.

It is an object of the invention to provide a tape recorder for language study which makes it possible for students to study foreign languages easily and efficiently.

It is a further object of the invention to provide a tape recorder for language study in which the danger of erroneous erasure of recorded materials of magnetic tapes is perfectly eliminated.

It is a still further object of the invention to provide a tape recorder for language study which can also be used as a conventional tape recorder.

These and other objects will become apparent from the following detailed description taken together with the accompanying drawings, wherein.

Before proceeding with a detailed description of the invention, a system using a tape recorder for language study will be explained with reference to FIG. 1, which shows a schematic view of an instructional tape.

Figure 1:
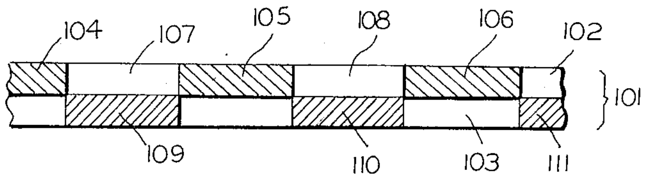
FIG. 1 is a schematic view of an instructional tape which has parts of an instructional program successively recorded thereon with moderate length blank intervals there between to make it possible for students to make their oral responses within the time of these blank intervals.

Referring now to the drawings, and more particularly to FIG. 1, an instructional tape 101 has two recording tracks 102 and 103 along the length thereof. Said recording track 102 has the parts 104, 105 and 106 of an instructional program recorded successively thereon at suitable intervals 107 and 108 so as to enable a student to finish his oral responses within these intervals.

Said recording track 103 is supplied to make it possible for a student to record his oral responses made to said instructional program onto intervals between successive parts of the instructional program.

The oral responses of the student are recorded onto parts 109, 110 and 111 of said recording track 103.

The tape recorder for language study with said instructional tape 101 has at least two recording/reproducing channels for processing both said instructional program and said oral responses of the student.

The tape recorder for language study having an instructional program successively recorded on a magnetic tape operates as follows: one of said two recording/reproducing channels is set to a reproducing operation and the other of said two recording/reproducing channels is set to a recording operation, in order to make it possible for a student to hear said instructional program reproduced from said tape recorder and to record his oral responses thereon.

Next, said two recording/reproducing channels of said tape recorder are set to a reproducing operation after rewinding said magnetic tape on which said instructional program and said oral response of said student are recorded successively in different tracks, in order to compare said oral response with said instructional program.

Said recording/reproducing channels for processing said instructional program and said oral response are called hereinafter a program channel and a student channel, respectively, for the sake of simplicity of description.

The electrical circuit of the tape recorder is not an important constituent of the invention. Therefore the detailed description thereof has been omitted.

Figure 2:
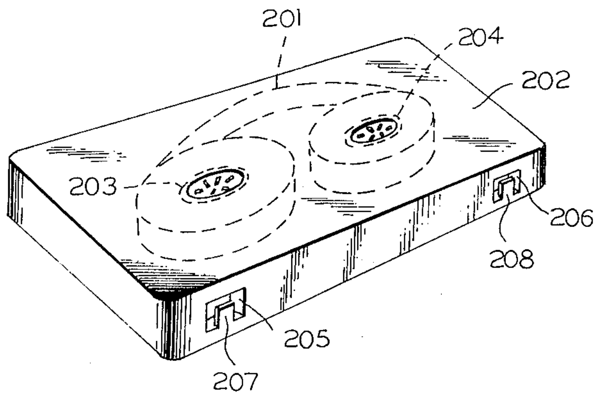
FIG. 2 is a schematic view of a cassette tape case containing a magnetic tape therein in the back of which there are a pair of holes with break out lugs.

Referring to FIG. 2, a magnetic tape 201 shown therein is contained in a case 202 in order to facilitate handling and to prevent said magnetic tape from becoming contaminated.

Said magnetic tape 201 is fixed to and wound on rotatable hubs 203 and 204.

These two hubs 203 and 204 are rotatably driven by supply and take-up spindles inserted therein in order to drive said magnetic tape 201 in forward and reverse directions.

In the back of said case 202, a pair of holes 205 and 206 with breakout lugs 207 and 208, respectively, are provided for eliminating any erroneous erasure of materials recorded on the tape.

Whether or not said breakout lugs are broken is detected by a sensing device of the tape record which will not allow the tape recorder to operate if said break-out lugs are broken.

Figure 3:
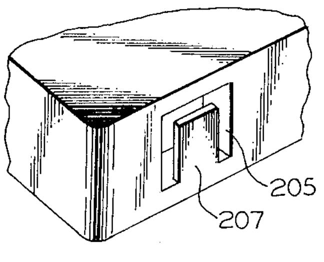
FIG. 3 is a schematic view of an enlarged hole with the breakout lug shown in FIG. 2.

Referring to FIG. 3, wherein hole 205 is shown in enlarged form for better understanding, said breakout lug 207 is made by rather thin plastic material in order to be broken easily.

Figure 4:
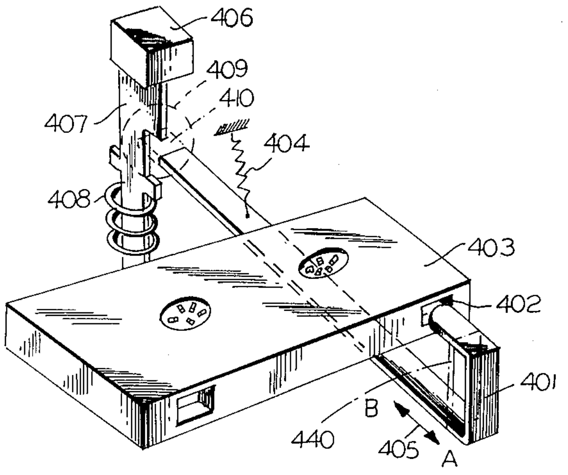
FIG. 4 is a simplified sketch of an operating device for eliminating the erroneous erasure of recorded materials of said conventional tape recorder.

Referring now to FIG. 4, wherein a simplified sketch of known an operating device for eliminating the erroneous erasure of recorded materials is shown, a sensing lever 401 is slidably mounted on a chasis (not shown) of a tape recorder to detect whether or not a breakout lug of a hole 402 in a magnetic tape case 403 is broken.

Said sensing lever 401 is tensioned by a spring 404 fixed thereon in the direction B shown by arrow 405, and is slidably moved to the direction B if said breakout lug of said hole 402 is broken.

A recording button 406 mounted on an actuator 407 which is slidably mounted on said chasis actuates a recording switch (not shown).

Upon pushing said recording button 406 said recording switch is changed to a recording position from a reproducing position by said actuator 407 which is normally urged upwardly by a spring 408.

Said sensing lever 401 and said actuator 407 are positioned in such manner that when said breakout lug of said hole 402 is not broken and consequently said sensing lever 401 is retained in the direction A, said actuator 407 can be pushed down; and when said breakout lug of said hole 402 is broken and consequently said sensing lever 401 is moved to the direction B, said actuator 407 can not be pushed down because said actuator 407 is encountered with said sensing lever 401 at a part shown in dashed line circle 409 of FIG. 4. (see dashed line 410)

The erroneous erasure of recorded materials is thus eliminated by a breakout lug of a hole in the back of a magnetic tape case in association with said sensing lever.

Before going into a discussion of problems arising between a conventional tape recorder and a tape recorder for language study, various configurations of recording tracks of a magnetic tape of the conventional tape recorder will be briefly described with reference to FIG. 5 and FIG. 6.

Figure 5:
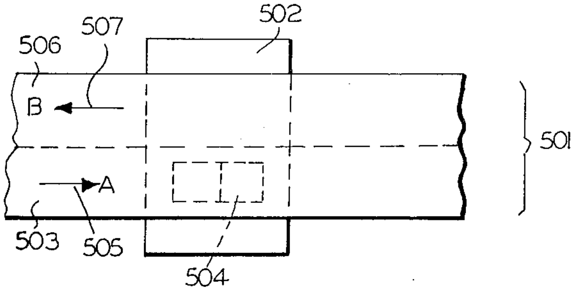
FIG. 5 is a fragmentary elevational view of a magnetic tape having two tracks thereon together with a magnetic recording and reproducing head.

Referring to FIG. 5 wherein a conventional two track monoural magnetic tape 501 is shown together with a magnetic recording head 502, a recording signal is, at first, recorded onto a lower track 503 by a head gap 504 in the direction A shown by an arrow 505. The magnetic tape 501 is then turned over in order to continue recording onto an upper track 506 in the direction B shown by an arrow 507.

Figure 6:
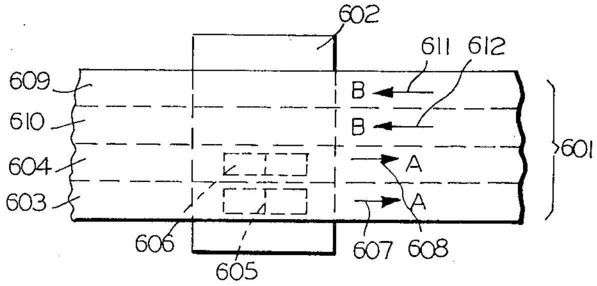
FIG. 6 is a fragmentary elevational view of a magnetic tape having four tracks thereon together with a magnetic recording and reproducing head.

Referring now to FIG. 6 where a conventional four track stereo magnetic tape 601 together with a magnetic recording head 602 is shown, a stereo recording signal is, at first recorded onto lower tracks 603 and 604 by head gaps 605 and 606, respectively, in the direction A shown by arrows 607 and 608. The magnetic tape 601 is then turned over in order to continue recording onto upper tracks 609 and 610 in the direction B shown by arrows 611 and 612.

These track configurations shown in FIGS. 5 and 6 are widely known and used.

There will now be described the problems involved in interchanging of tapes between the conventional tape recorder and the tape recorder for language study, hereinafter referred to as an instructional tape recorder.

Figure 7:
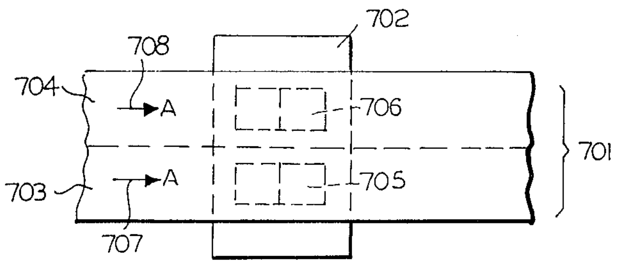
FIG. 7 is a fragmentary elevational view of a magnetic tape having two tracks thereon together with a magnetic recording and reproducing head used in an instructional tape recorder of the invention.

Referring to FIG. 7, wherein a magnetic tape 701 together with a magnetic recording head 702 of an instructional tape recorder is shown, said magnetic tape 701 has two recording/reproducing tracks 703 and 704.

An instructional program and an oral response of a student are recorded separately either on said track 703 or 704 by magnetic head gaps 705 and 706 in the direction A shown by arrows 707 and 708.

In this case described above, magnetic tape 701 is used in single direction and thus differs from the two cases described with reference to FIG. 5 and FIG. 6.

If said instructional program and said oral response are recorded on said tracks 704 and 703 of said magnetic tape 701, respectively, by said instructional tape recorder, then a conventional tape recorder, which is either two track monoural or four track stereo, cannot reproduce said instructional program but can reproduce said oral response of said student recorded on said track 703.

On the other hand, if the arrangement of tracks described above is inverted in order to eliminate the aforesaid inconvenience, then said instructional program would be recorded on said track 703 and could be reproduced by said conventional tape recorder. Another problem, however, arises due to the interchanging of magnetic tapes between said instructional tape recorder and said conventional tape recorder.

Generally, one expects to also use an instructional tape recorder as a conventional tape recorder in order to record or reproduce speech or music.

In the above case, said speech or music as well as said oral response could be recorded on said student channel, track 704. Therefore one can use said instructional tape recorder as a conventional tape recorder.

However, said magnetic tape recorded by said instructional tape recorder can not be reproduced by said conventional tape recorder of either two track monoural or four track stereo.

Furthermore an erroneous erasure of said instructional program from an incorrect operation will arise when said instructional tape on which said instructional program is recorded on said track 703 is used in said conventional tape recorder.

Figure 8:
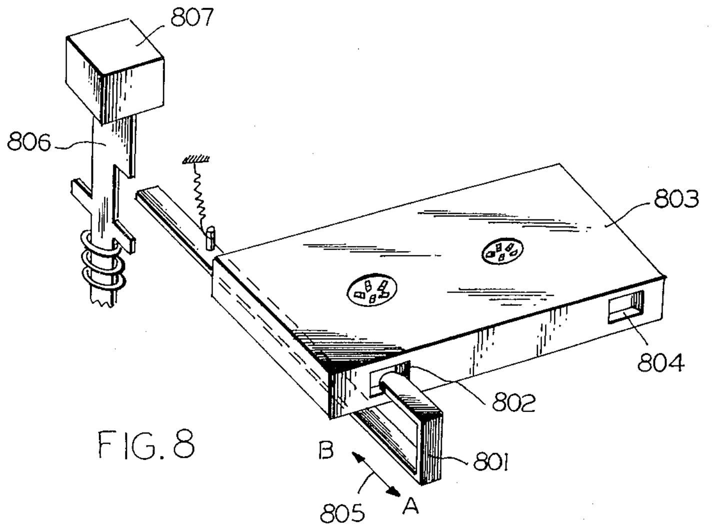
FIG. 8 is a simplified sketch of an operating device for eliminating the erroneous erasure of recorded materials of the tape recorder for language study of the present invention.

Referring now to FIG. 8, wherein a simplified sketch of an operating device of an instructional tape recorder according to present invention for eliminating the aforesaid erroneous erasure of an instructional program is shown, a sensing lever 801 detects the presence of a breakout lug in a hole 802 of a magnetic tape case 803 in a way similar to that previously shown with reference to FIG. 4.

The instructional tape recorder shown in FIG. 8 is designed to detect a breakout lug in one end of the case 803, while a conventional tape recorder would detect a break-out lug in the other end of the case 803 in the manner shown with reference to FIG. 4.

Said instructional tape case 803 has a breakout lug in hole 802 but does not have a breakout lug in hole 804.

Then, said sensing lever 801 slidably mounted on a chasis (not shown) is retained in to the direction A shown by an arrow 805 in order to enable an actuator 806 to be pushed down and to enable a recording of an oral response of a student onto the into a magnetic tape contained in said case 803.

If said magnetic tape case 803 is inserted in an inverted manner into said instructional tape recorder, then said sensing lever 801 can not encounter with a breakout lug of said hole 804 and moves to the direction B shown by arrow 805, and this situation makes the depression of recording button 807 impossible.

Consequently, the possibility of an erroneous erasure of said valuable instructional program is eliminated.

On the other hand, if said magnetic tape case 803 is used in a conventional tape recorder, then said conventional tape recorder can not be operated in a recording condition when said magnetic tape case 803 is properly inserted so as to reproduce said instructional program. Therefore, said instructional program recorded on said magnetic tape is safely protected from an erroneous erasure caused by an erroneous operation.

Furthermore, if a pre-recorded tape such as a music tape, in which breakout lugs are provided in neither hole, is used in said instructional tape recorder, then said sensing lever 801 can not encounter a breakout lug and moves to the direction B shown in said arrow 805, and this situation makes a depression of a recording button 807 impossible.

The instructional tape recorder of the invention essentially having a mechanism as shown into FIG. 8 can thus completely eliminate the erroneous erasure of valuable instructional programs.

Figure 9:
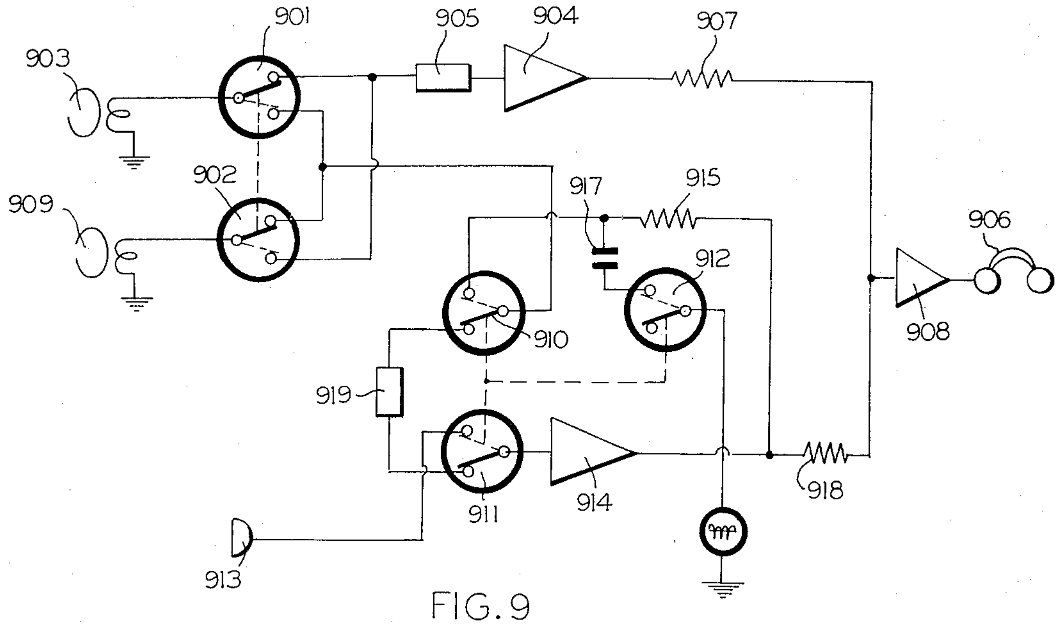
FIG. 9 is a schematic diagram of an electrical circuit of the tape recorder for language study of the present invention.

Referring now to FIG. 9, wherein a schematic diagram of an electrical circuit of an instructional tape recorder of the present invention is shown, switches 901 and 902 are used to change recording tracks on a magnetic tape in order to use said magnetic tape interchangeably between said instructional tape recorder and a conventional tape recorder.

When said instructional tape recorder is used as an instructional tape recorder, said switches 901 and 902 are switched to the positions indicated by solid lines in FIG. 9.

An instructional program reproduced from a magnetic head 903 is fed to a program amplifier 904 through said switch 901 and a reproducing equlizer 905 and is produced as an audiable signal in a headphone 906 through a mixing resistor 907 and a monitor amplifier 908.

A student makes oral responses to said instructional program sounded in said headphone 906 and said oral responses are recorded on said magnetic tape through a magnetic head 909.

In this case, however, recording/reproducing switches 910, 911 and 912 must be switched to the positions indicated by dotted lines in FIG. 9.

Said oral responses are converted to an electrical signal by a microphone 913 and are fed to an amplifier 914 through said switch 911 and recorded by said magnetic head 909 through a recording resistor 915 and said switch 910.

A bias signal generated from a bias oscillator 916 is supplied to an erasing head (not shown) and to said magnetic head 909 through said switch 912 and a coupling capacitor 917 so as to insure recording linearity.

A recording signal of said oral responses is mixed with said instructional signal by a mixing resistor 918 and is produced as an audible signal in said headphone 906 through said monitor amplifier 908.

After completion of recording of such oral response made to said instructional signal, said magnetic tape is rewound to the beginning of said recording, and then said instructional tape recorder is set to a reproducing operation in which an instructional channel and a student channel are both in reproducing conditions.

In said reproducing operation of said student channel, said switches 910, 911 and 912 must be switched to the positions indicated by solid lines in FIG. 9.

Said recorded oral responses reproduced by said magnetic head 909 are fed to said amplifier through said switches 902, 910 and 911 and a reproducing equalizer 919, and are produced as audible signals in said headphone through said mixing resistor 918 and said monitor amplifier 908.

Therefore, the student can hear both said instructional program and said oral responses simultaneously, and can compare these two reproduced signals.

Switches 901 and 902 are switched to the positions indicated by dashed lines in FIG. 9 to change a recording track on said magnetic tape when said instructional tape recorder is used as a conventional tape recorder.

In the case described above, a recording signal from said microphone 913 is recorded on a lower track of said magnetic tape through said student channel in a manner similar to that of a conventional tape recorder.

Said instructional tape recorder of the invention having a function of selecting a recording track, however, causes other problems.

One of these problems is the danger of erasing the instructional program when recorded on a lower track of said magnetic tape by selecting the lower recording track erroneously. Another of these problems is to select an upper recording track erroneously for a conventional magnetic tape.

This latter problem makes it impossible to interchange said conventional magnetic tape between said instructional tape recorder and a conventional tape recorder by which only a lower track is recorded or reproduced.

It is, therefore, required for said instructional tape recorder of the invention to have a function described as follows: when a magnetic tape having an instructional program recorded thereon is used with said instructional tape recorder, a recording is possible on an upper track but not possible on a lower track, and when a magnetic tape of a conventional use is used on said instructional tape recorder, recording is not possible on an upper track but is possible on a lower track.

Figure 10:
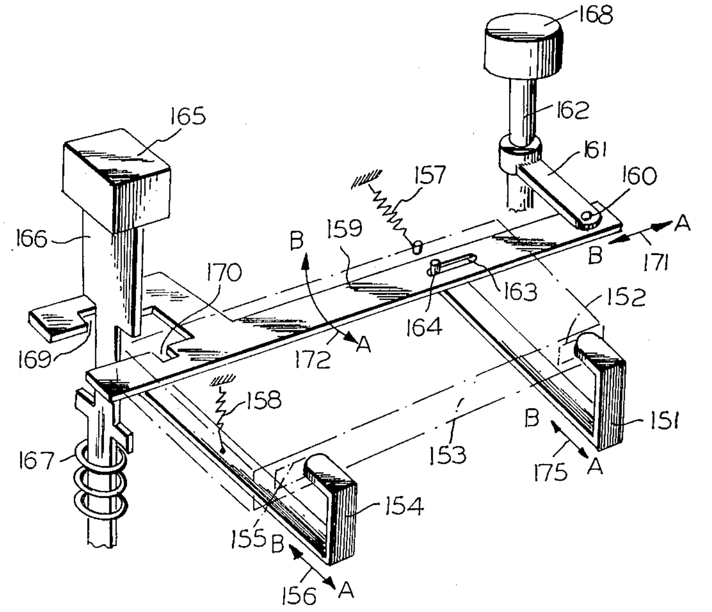
FIG. 10 is a schematic diagram of a preferred embodiment of the invention for eliminating an erroneous erasure of a recorded instructional program.

Referring now to FIG. 10 wherein a schematic diagram of a preferred embodiment of the invention for carrying out the aforesaid function is shown, a sensing lever 151 is introduced for detecting the presence or absence of a breakout lug of a hole 152 made at the back edge of a magnetic tape case 153.

A sensing lever 154 has a function similar to that described with reference to FIG. 8 and prevents an erroneous erasure of an instructional program or a recorded source such as music or a speech when hole 155 has no lug.

Said sensing levers 151 and 154 are slidably mounted on a chassis (not shown) and are tensioned in the direction B shown by arrows 175 and 156, respectively, by springs 157 and 158, respectively.

A stopper plate 159 pivotally mounted at a pin 160 with an actuating arm 161 which is fixed to a shaft 162 has a slot 163 therein in which an actuating pin 164 fixed on said sensing lever 151 moves. A recording button 165 with an actuator 166 is urged upwardly by a spring 167 and actuates a recording switch (not shown).

A selecting knob 168 with said shaft 162 turns a switch (not shown) for selecting a recording track on a magnetic tape.

Said stopper plate 159 has two slots 169 and 170 and moves as indicated by arrow 171 when said actuating arm 161 is operated, and turns as indicated by a circular arrow 172 when said sensing lever 151 slides along said arrow 175, in order to allow actuator 166 to stop or pass selectively in accordance with the presence or absence of a breakout lug in said hole 152 and the position of said selecting knob 168.

The operation of said instructional tape recorder of the invention will be described with reference to FIG. 10 as follows:

When a magnetic tape for instructional use in which hole 152 has no lug while hole 155 has a lug is used with said instructional tape recorder, said sensing lever 151 moves to the direction B indicated by said arrow 175, causing said stopper plate 159 to turn in the direction B indicated by circular arrow 172, while said sensing lever 154 remains in the direction A indicated by said arrow 156. In the aforesaid situation, said recording button 165 can be depressed if said selecting knob 168 is turned clockwise, because said actuator 166 passes through said slot 170 in consequence of the movement of said stopper plate 159 to the direction B as indicated by said arrow 171. On the other hand, if said selecting knob 168 is turned counter-clockwise, said recording button 165 can not be depressed, because said actuator 166 is encountered with said stopper plate 159 which has moved in the direction A indicated by said arrow 171.

Said switch (not shown) for selecting a recording track on said magnetic tape is so wired that a recording is made to an upper track and to a lower track when said switch turns clockwise and counter-clockwise, respectively.

Consequently, a recording operation can not be made on an instructional tape when said switch for selecting a recording track selects a lower track.

When a magnetic tape for a conventional use in which breakout lugs of said holes 152 and 155 are not broken is used on said instructional tape recorder, said sensing lever 151 is retained in direction A indicated by said arrow 175, causing said stopper plate 159 to move to the direction A indicated by said circular arrow 172 while said sensing lever 154 is retained in direction A as indicated by arrow 156 in a manner similar to that described above. In this case, said recording button 165 can be pushed down if said selecting knob 168 is turned counter-clockwise because said actuator 166 passes through said slot 169 due to the movement of said stopper plate 159 in the direction A indicated by said arrow 171.

On the other hand, if said selecting knob 168 is turned clockwise, said recording button 165 can not be pushed down because said actuator 166 is encountered with said stopper plate 159 and stopped due to the movement of said stopper plate 159 in the direction B indicated by said arrow 171.

Consequently a recording to a lower track is enabled when a conventional tape is being used.

If a student selects a wrong recording track by mistake, then the recording button is locked automatically by the detection of a breakout lug of the magnetic tape case, thereby eliminating an erroneous erasure of valuable recorded materials.

Figure 11:
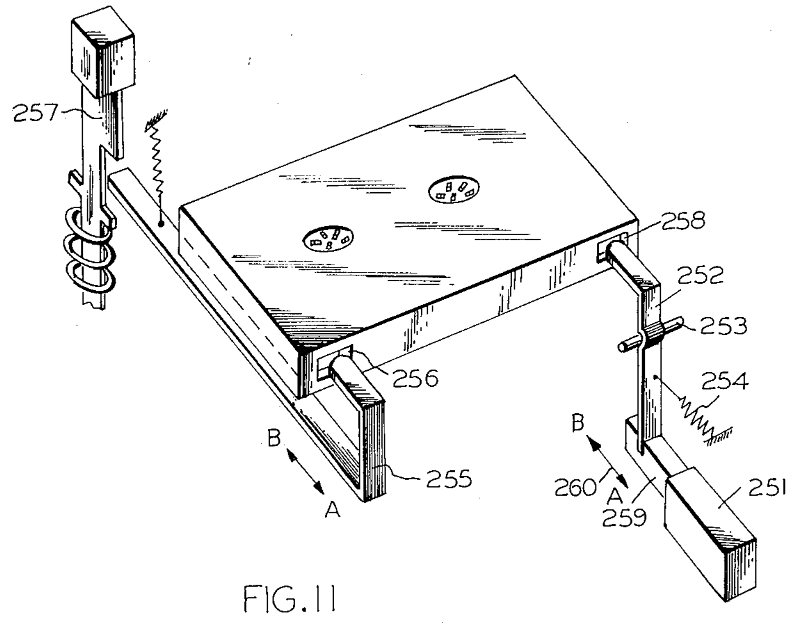
FIG. 11 is a schematic diagram of a preferred embodiment of the invention where a recording track is automatically selected in accordance with the type of a magnetic tape used.

Referring now to FIG. 11 where a schematic diagram of another preferred embodiment of the invention for carrying out the aforesaid function is shown, a switch 251 for selecting a recording track on a magnetic tape is actuated directly by a sensing lever 252 being rotatably fixed by a pin 253 and being tensioned by a spring 254. A sensing lever 255 has a function similar to that described with reference to FIG. 8 and prevents an erroneous erasure of an instructional program or a recorded source such as music or a speech when hole 256 has no lug, by locking an actuator 257 mechanically.

The operation of this embodiment of the instructional tape recorder of the invention will be described with reference to FIG. 11 as follows: when a magnetic tape for an instructional use wherein hole 258 has no breakout lug of and hole 256 has a lug is used with said instructional tape recorder, said sensing lever 252 rotates around said pin 253 moving an actuator 259 of said switch 251 to the direction A as indicated by an arrow 260. Said switch 251 for selecting a recording track on a magnetic tape 261 is so wired that a recording is made to an upper track and to a lower track when said actuator 259 is moved in the directions A and B, respectively, as indicated by said arrow 260. On the other hand, when a magnetic tape for a conventional use wherein both holes 258 and 256 have lugs is used with said instructional tape recorder, said sensing lever 252 rotates around said pin 253 moving said actuator 259 of said switch 251 to the direction B as indicated by said arrow 260. Then a lower recording track is automatically selected.

Thus, the instructional tape recorder can select the proper recording track automatically in accordance with types of magnetic tapes inserted therein.

Figure 12:
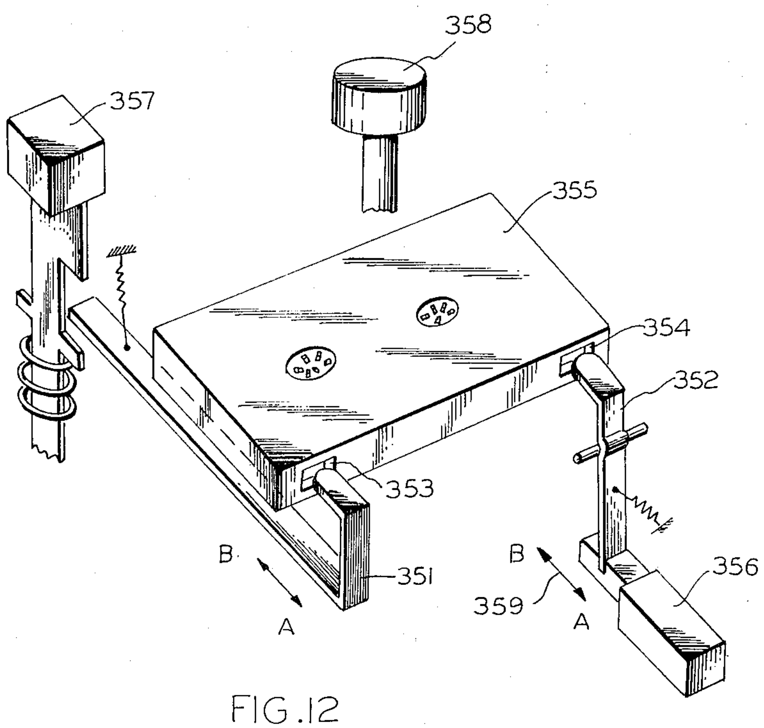
FIG. 12 is a schematic diagram of a preferred embodiment of the invention where an erroneous operation causes a warning signal.

Referring now to FIg. 12 where a schematic diagram of a further preferred embodiment of the invention is shown, an instructional tape recorder of the invention has the function of eliminating erroneous erasure of recorded materials in a way different from those described previously.

Thus, said preferred embodiment of the instructional tape recorder of the invention stops its recording function and actuates a warning signal when a student makes a recording improperly, in order to prevent an erroneous erasure.

The mechanical construction of said instructional tape recorder is similar to those shown with reference to FIG. 10 and FIG. 11, thus the description of said mechanical construction is eliminated.

Referring again to FIG. 12, sensing levers 351 and 352 detect the presence or absence of breakout lugs in holes 353 and 354, respectively, of a magnetic tape case 355 in a way similar to that described in FIG. 11.

Said sensing lever 352 actuates a switch 356 which is used for detecting the presence of said takeout lug in said hole 354. A recording button 357 and a selecting knob 358 operate switches (not shown) for recording and for selecting a recording channel, respectively.

Figure 13:
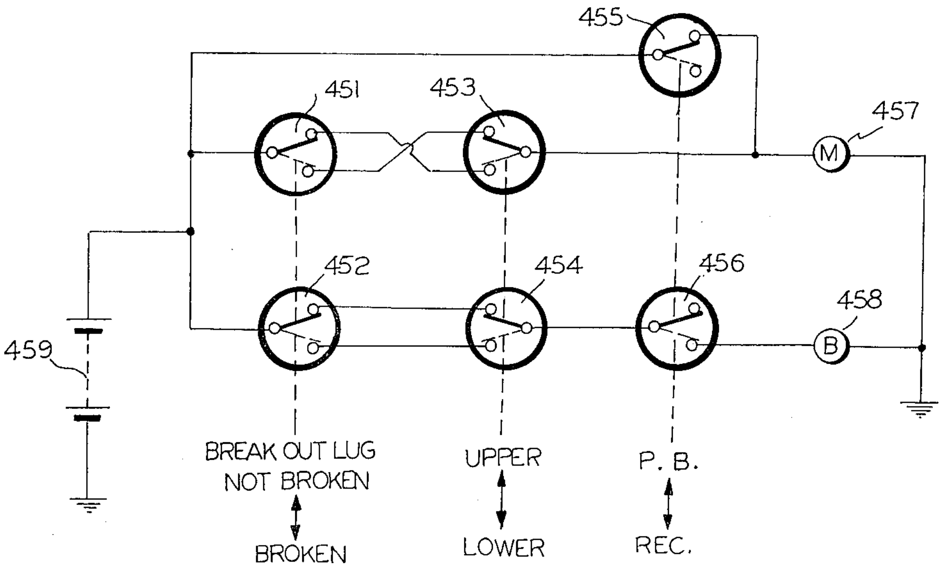
FIG. 13 is a schematic diagram of an electrical circuit of said instructional tape recorder of the invention shown in FIG. 12.

Referring now to FIG. 13, wherein a schematic diagram of an electrical circuit of the embodiment of FIG. 12 is shown, switches 451 and 452 are electrical contacts of said switch 356 shown in FIG. 12 and are operated simultaneously by said sensing lever 352. Switches 453 and 454 are electrical contacts of said switch 358 for selecting a recording track as described with reference to FIG. 12. Switches 455 and 456 are electrical contacts of said recording switch operated by said recording button 357 show in FIG. 12.

A motor 457 for driving said magnetic tape, a buzzer 458 for warning a student when he makes an improper operation and a battery 459 for supplying an electrical power to said motor 457 and a circuit associated therewith are connected as shown in FIG. 13.

The operation of said instructional tape recorder of the invention will be described with reference to FIG. 12 and FIG. 13 as follows: When a magnetic tape for an instructional use is inserted to the instructional tape recorder shown in FIG. 12, said sensing lever 352 actuates said switch to the direction A show by an arrow 359, and consequently said switches 451 and 452 are switched to the positions illustrated by dashed lines in FIG. 13.

In the case described above, a student can select a recording track at either a lower or upper track, but if a lower track is selected, and said recording button 357 is depressed, then all of said switches 451, 452, . . . 455 and 456 are positioned as illustrated by dashed lines in FIG. 13. Electric power supplied to said motor 457 from battery 459 is, therefore, stopped and said buzzer 458 is connected to said battery 459.

Consequently, said instructional tape recorder stops its recording function and makes a warning sound for protecting said magnetic tape from an erroneous erasure when the student makes an improper operation.

On the other hand, when a magnetic tape for a conventional use is inserted in said instructional tape recorder and an upper recording track is selected, said switches 451, 452, 453 and 454 are positioned as illustrated by solid lines in FIG. 13. In this case, said instructional tape recorder also stops and makes a warning sound when said recording button 357 is depressed. However, if a lower track is selected, recording is possible and the alarm is not actuated.

One can use a lamp instead of or in parallel with said warning buzzer 458 for obtaining a visual warning signal.

Although preferred embodiments of the invention have been set forth in detail, it is desired to emphasize that they are not intended to be exhaustive or necessarily limitative; on the contrary, the disclosure herein is set for the purpose of illustrating the invention and thus to enable others skilled in the art to adapt the invention in such ways as meet the requirements of particular applications, it being understood that various modifications can be mode without departing from the scope of the invention.

What is claimed is:

1. An instructional tape recorder adapted for use with a tape case containing a magnetic tape having an upper and a lower track therein and having right and left breakout lugs in the back edge thereof, comprising in combination, a driving means for moving said magnetic tape, a recording and reproducing means, a recording switch actuated by a recording button for controlling said recording and reproducing means to record and reproduce an oral signal, an electrical switch to change the track used for recording said oral signal from said upper track to said lower track of said magnetic tape, a first sensing means and a second sensing means for detecting the presence of said right and left breakout lugs, respectively, a first locking means connected with said first sensing means for selectively locking said recording button to prevent depression thereof, a second locking means connected with said second sensing means and said electrical switch for selectively locking said recording button to prevent depression thereof, whereby said first sensing means actuates said first locking means to prevent said recording button from being depressed when said right breakout lug is broken, and simultaneously said second sensing means actuates said second locking means in cooperation with said electrical switch in order to prevent said recording button from being depressed, either when said left breakout lug is broken and said electrical switch selects said lower track of said magnetic tape as the track used for recording said oral signal, or when said left breakout lug is not broken and said electrical switch selects said upper track of said magnetic tape as the track used for recording said oral signal.

2. An instructional tape recorder adapted for use with a tape case containing a magnetic tape having an upper and lower track therein and having right and left breakout lugs in the back edge thereof, comprising in combination, a driving means for moving said magnetic tape, a recording and reproducing means, a recording switch actuated by a recording button for controlling said recording and reproducing means to record and reproduce an oral signal, an electrical switch to change the track used for recording said oral signal to said lower track from said upper track of said magnetic tape, a first sensing means and a second sensing means for detecting the presence of said right and left breakout lugs, respectively, a locking means connected with said first sensing means for selectively locking said recording button to prevent depression thereof, a connecting means connecting said second sensing means to said electrical switch for actuating said electrical switch, whereby said first sensing means actuates said locking means to prevent said recording button from being depressed when said right breakout lug is broken, and simultaneously said second sensing means actuates said electrical switch through said connecting means in order to select said upper track and said lower track of said magnetic tape as the track used for recording said oral signal when said left breakout lug is broken and not broken, respectively.

3. An instructional tape recorder adapted for use with a tape case containing a magnetic tape having an upper and a lower track therein and having right and left breakout lugs in the back edge thereof, comprising in combination, a driving means for moving said magnetic tape, a recording and reproducing means, a recording switch operated by a recording button for controlling said recording and reproducing means to record and reproduce an oral signal, a first electrical switch to change the track used for recording said oral signal from said upper track to said lower track of said magnetic tape, a first sensing means and a second sensing means for detecting the presence of said right and left breakout lugs respectively, a locking means connected with said first sensing means for selectively locking said recording button to prevent depression thereof, a second electrical switch connected with said second sensing means, an electrical network connected with said recording switch and said first and second electrical switches for stopping the recording function of said instructional tape recorder and simultaneously making a warning signal by sound and/or light, whereby said first sensing means actuates said locking means to prevent said recording button from being depressed when said right breakout lug is broken, and simultaneously said electrical network stops said recording function and makes said warning signal, either when said left breakout lug is broken and said first electrical switch selects said lower track of said magnetic tape as the track used for recording said oral signal, or when said left breakout lug is not broken and said first electrical switch selects said upper track of said magnetic tape as the track used for recording said oral signal.

* * * * *